United States Patent
Worley, III

(10) Patent No.: US 9,508,194 B1
(45) Date of Patent: Nov. 29, 2016

(54) UTILIZING CONTENT OUTPUT DEVICES IN AN AUGMENTED REALITY ENVIRONMENT

(75) Inventor: William Spencer Worley, III, Half Moon Bay, CA (US)

(73) Assignee: Amazon Technologies, Inc., Seattle, WA (US)

(*) Notice: Subject to any disclaimer, the term of this patent is extended or adjusted under 35 U.S.C. 154(b) by 925 days.

(21) Appl. No.: 12/982,457

(22) Filed: Dec. 30, 2010

(51) Int. Cl.
 G06T 19/00 (2011.01)
 G06F 3/01 (2006.01)

(52) U.S. Cl.
 CPC ............ *G06T 19/006* (2013.01); *G06F 3/012* (2013.01)

(58) Field of Classification Search
 CPC ..... G06T 19/006; G06T 19/00; G06F 3/011; G06F 3/012; G02B 27/017
 See application file for complete search history.

(56) References Cited

U.S. PATENT DOCUMENTS

| | | | |
|---|---|---|---|
| 3,835,245 | A | 9/1974 | Pieters |
| 3,840,699 | A | 10/1974 | Bowerman |
| 4,112,463 | A | 9/1978 | Kamin |
| 5,704,836 | A | 1/1998 | Norton et al. |
| 5,946,209 | A | 8/1999 | Eckel et al. |
| 6,059,576 | A | 5/2000 | Brann |
| 6,098,091 | A | 8/2000 | Kisor |
| 6,503,195 | B1 | 1/2003 | Keller et al. |
| 6,618,076 | B1 | 9/2003 | Sukthankar et al. |
| 6,690,618 | B2 | 2/2004 | Tomasi et al. |
| 6,760,045 | B1 | 7/2004 | Quinn et al. |
| 6,789,903 | B2 | 9/2004 | Parker et al. |
| 6,803,928 | B2 | 10/2004 | Bimber et al. |
| 6,811,267 | B1 | 11/2004 | Allen et al. |
| 7,046,214 | B2 | 5/2006 | Ebersole, Jr. et al. |
| 7,134,756 | B2 | 11/2006 | Drucker et al. |
| 7,168,813 | B2 | 1/2007 | Wong et al. |
| 7,315,241 | B1 | 1/2008 | Daily et al. |
| 7,418,392 | B1 | 8/2008 | Mozer et al. |

(Continued)

FOREIGN PATENT DOCUMENTS

| | | |
|---|---|---|
| WO | WO2009112585 | 9/2009 |
| WO | WO2011088053 A2 | 7/2011 |
| WO | WO2011/115623 A1 | 9/2011 |

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

(Continued)

*Primary Examiner* — Michelle Chin
(74) *Attorney, Agent, or Firm* — Lee & Hayes, PLLC

(57) ABSTRACT

Techniques for enabling an augmented reality system to utilize existing output devices in an environment are described herein. An augmented reality system may include one or more augmented reality functional nodes (ARFNs) that are configured to project content onto different non-powered and/or powered display mediums. In addition to projecting content in this manner, the ARFN may also utilize existing content output devices within the environment to further enhance a user's experience while consuming the content. For instance, the ARFN may identify that a television exists within the environment and, in response, the ARFN may instruct the television to display certain content. For instance, if the ARFN is projecting a particular movie, the ARFN may stream or otherwise provide an instruction to the television to begin displaying the movie if the television would provide a better viewing experience than the projector.

40 Claims, 10 Drawing Sheets

(56) References Cited

U.S. PATENT DOCUMENTS

| | | |
|---|---|---|
| 7,538,764 B2 | 5/2009 | Salomie |
| 7,720,683 B1 | 5/2010 | Vermeulen et al. |
| 7,743,348 B2 | 6/2010 | Robbins et al. |
| 7,774,204 B2 | 8/2010 | Mozer et al. |
| 7,911,444 B2 | 3/2011 | Yee |
| 7,925,996 B2 | 4/2011 | Hofmeister et al. |
| 7,949,148 B2 | 5/2011 | Rhoads et al. |
| 7,991,220 B2 | 8/2011 | Nagai et al. |
| 8,107,736 B2 | 1/2012 | Brown et al. |
| 8,159,739 B2 | 4/2012 | Woodgate et al. |
| 8,199,966 B2 | 6/2012 | Guven et al. |
| 8,253,746 B2 | 8/2012 | Geisner et al. |
| 8,255,829 B1 | 8/2012 | McCormick et al. |
| 8,264,536 B2 | 9/2012 | McEldowney |
| 8,284,205 B2 | 10/2012 | Miller et al. |
| 8,285,256 B2 | 10/2012 | Gupta et al. |
| 8,307,388 B2 | 11/2012 | Igoe et al. |
| 8,308,304 B2 | 11/2012 | Jung et al. |
| 8,356,254 B2 | 1/2013 | Dennard et al. |
| 8,382,295 B1 | 2/2013 | Kim et al. |
| 8,408,720 B2* | 4/2013 | Nishigaki et al. .............. 353/94 |
| 8,591,039 B2 | 11/2013 | Morrison et al. |
| 8,723,787 B2* | 5/2014 | Jung .................. G06F 3/03 345/156 |
| 8,743,145 B1 | 6/2014 | Price |
| 2001/0049713 A1 | 12/2001 | Arnold et al. |
| 2001/0056574 A1 | 12/2001 | Richards |
| 2002/0001044 A1 | 1/2002 | Villamide |
| 2002/0070278 A1 | 6/2002 | Hung et al. |
| 2002/0168069 A1 | 11/2002 | Tehranchi et al. |
| 2003/0156306 A1 | 8/2003 | Kitamura |
| 2004/0046736 A1 | 3/2004 | Pryor et al. |
| 2004/0114581 A1* | 6/2004 | Hans ................. H04L 29/06027 370/356 |
| 2004/0190716 A1 | 9/2004 | Nelson |
| 2004/0201823 A1 | 10/2004 | Raskar et al. |
| 2005/0081164 A1 | 4/2005 | Hama et al. |
| 2005/0099432 A1* | 5/2005 | Chavis ................. G06F 9/4443 345/619 |
| 2005/0110964 A1 | 5/2005 | Bell et al. |
| 2005/0128196 A1 | 6/2005 | Popescu et al. |
| 2005/0254683 A1 | 11/2005 | Schumann et al. |
| 2005/0264555 A1 | 12/2005 | Zhou et al. |
| 2005/0276444 A1 | 12/2005 | Zhou et al. |
| 2005/0288078 A1 | 12/2005 | Cheok et al. |
| 2005/0289590 A1 | 12/2005 | Cheok et al. |
| 2006/0028400 A1 | 2/2006 | Lapstun et al. |
| 2006/0041926 A1 | 2/2006 | Istvan et al. |
| 2006/0080408 A1 | 4/2006 | Istvan et al. |
| 2006/0152803 A1 | 7/2006 | Provitola |
| 2006/0170880 A1 | 8/2006 | Dambach et al. |
| 2006/0218503 A1 | 9/2006 | Matthews et al. |
| 2006/0262140 A1 | 11/2006 | Kujawa et al. |
| 2007/0005747 A1 | 1/2007 | Batni et al. |
| 2007/0024644 A1 | 2/2007 | Bailey |
| 2007/0239211 A1 | 10/2007 | Lorincz et al. |
| 2007/0260669 A1 | 11/2007 | Neiman et al. |
| 2008/0094588 A1 | 4/2008 | Cole et al. |
| 2008/0151195 A1 | 6/2008 | Pacheco et al. |
| 2008/0174735 A1 | 7/2008 | Quach et al. |
| 2008/0180640 A1 | 7/2008 | Ito |
| 2008/0186255 A1 | 8/2008 | Cohen et al. |
| 2008/0229318 A1 | 9/2008 | Franke |
| 2008/0273754 A1 | 11/2008 | Hick et al. |
| 2008/0301175 A1 | 12/2008 | Applebaum et al. |
| 2008/0320482 A1 | 12/2008 | Dawson et al. |
| 2009/0066805 A1 | 3/2009 | Fujiwara et al. |
| 2009/0073034 A1 | 3/2009 | Lin |
| 2009/0184888 A1* | 7/2009 | Chen et al. .................... 345/2.3 |
| 2009/0323097 A1 | 12/2009 | Iizuka |
| 2010/0011637 A1 | 1/2010 | Zhang |
| 2010/0026479 A1 | 2/2010 | Tran |
| 2010/0039568 A1 | 2/2010 | Tchoukaleysky |
| 2010/0060723 A1 | 3/2010 | Kimura et al. |
| 2010/0066676 A1 | 3/2010 | Kramer et al. |
| 2010/0164990 A1 | 7/2010 | Van Doorn |
| 2010/0199232 A1* | 8/2010 | Mistry et al. ................. 715/863 |
| 2010/0207872 A1 | 8/2010 | Chen et al. |
| 2010/0228632 A1 | 9/2010 | Rodriguez |
| 2010/0240455 A1* | 9/2010 | Gagner et al. ................. 463/30 |
| 2010/0253541 A1 | 10/2010 | Seder et al. |
| 2010/0257252 A1 | 10/2010 | Dougherty et al. |
| 2010/0281095 A1 | 11/2010 | Wehner et al. |
| 2010/0284055 A1 | 11/2010 | Kothari et al. |
| 2010/0322469 A1 | 12/2010 | Sharma |
| 2011/0010222 A1 | 1/2011 | Choudhary et al. |
| 2011/0012925 A1 | 1/2011 | Luo |
| 2011/0050885 A1 | 3/2011 | McEldowney |
| 2011/0061100 A1 | 3/2011 | Mattila et al. |
| 2011/0072047 A1 | 3/2011 | Wang et al. |
| 2011/0087731 A1 | 4/2011 | Wong et al. |
| 2011/0093094 A1 | 4/2011 | Goyal et al. |
| 2011/0096844 A1 | 4/2011 | Poupel et al. |
| 2011/0098056 A1 | 4/2011 | Rhoads et al. |
| 2011/0134204 A1 | 6/2011 | Rodriguez et al. |
| 2011/0154350 A1 | 6/2011 | Doyle et al. |
| 2011/0161912 A1 | 6/2011 | Eteminan et al. |
| 2011/0164163 A1 | 7/2011 | Bilbrey et al. |
| 2011/0178942 A1 | 7/2011 | Watters et al. |
| 2011/0197147 A1 | 8/2011 | Fai |
| 2011/0216090 A1 | 9/2011 | Woo et al. |
| 2011/0238751 A1 | 9/2011 | Belimpasakis et al. |
| 2011/0249197 A1 | 10/2011 | Sprowl et al. |
| 2011/0289308 A1 | 11/2011 | Sobko et al. |
| 2012/0009874 A1 | 1/2012 | Kiukkonen et al. |
| 2012/0120296 A1 | 5/2012 | Roberts et al. |
| 2012/0124245 A1 | 5/2012 | Reeves et al. |
| 2012/0127320 A1 | 5/2012 | Balogh |
| 2012/0130513 A1 | 5/2012 | Hao et al. |
| 2012/0223885 A1 | 9/2012 | Perez |
| 2012/0306878 A1 | 12/2012 | Wang et al. |
| 2013/0235354 A1 | 9/2013 | Kilcher et al. |
| 2013/0300637 A1 | 11/2013 | Smits et al. |
| 2014/0125649 A1 | 5/2014 | Carlin |

OTHER PUBLICATIONS

Office Action for U.S. Appl. No. 12/978,800, mailed on Oct. 25, 2013, William Spencer Worley III, "Integrated Augmented Reality Environment", 36 pages.

Office action for U.S. Appl. No. 12/977,760, mailed on Jun. 4, 2013, Worley III et al., "Generation and Modulation of Non-Visible Structured Light", 12 pages.

Office action for U.S. Appl. No. 12/982,519, mailed on Aug. 29, 2013, Worley III, "Complementing Operation of Display Devices in an Augmented Reality Environment", 12 pages.

Sneath, "The Bumper List of Windows 7 Secrets", retrieved on Aug. 21, 2013, at http://blogs.msdn.com/b/tims/archive/2009/01/12/ the bumper-list-of-windows-7-secrets.aspx., 2009, 13 pages.

Office action for U.S. Appl. No. 12/982,519, mailed on Feb. 7, 2013, Worley III , "Complementing Operation of Display Devices in an Augmented Reality Environment", 13 pages.

Office action for U.S. Appl. No. 12/977,760, mailed on Oct. 15, 2012, Worley III et al., "Generation and Modulation of Non-Visible Structured Light ", 13 pages.

Office Action for U.S. Appl. No. 12/977,949, mailed on Jan. 22, 2014, William Spencer Worley III, "Powered Augmented Reality Projection Accessory Display Device", 11 pages.

Office action for U.S. Appl. No. 12/977,924, mailed on Nov. 15, 2013, Coley, et al., "Characterization of a Scene With Structured Light", 9 pages.

Office Action for U.S. Appl. No. 13/236,294, mailed on Nov. 7, 2013, Christopher Coley, "Optical Interference Mitigation", 12 pages.

Office Action for U.S. Appl. No. 12/982,519, mailed on Feb. 12, 2014, William Spencer Worley III, "Complementing Operation of Display Devices in an Augmented Reality Environment", 12 pages.

Final Office Action for U.S. Appl. No. 13/236,294, mailed on Mar. 13, 2014, Christopher Coley, "Optical Interference Mitigation", 14 pages.

(56) References Cited

OTHER PUBLICATIONS

Office Action for U.S. Appl. No. 12/975,175, mailed on Apr. 10, 2014, William Spencer Worley III, "Designation of Zones of Interest Within an Augmented Reality Environment", 33 pages.

Office Action for U.S. Appl. No. 12/977,992, mailed on Apr. 4, 2014, William Spencer Worley III, "Unpowered Augmented Reality Projection Accessory Display Device", 6 pages.

Office Action for U.S. Appl. No. 12/978,800, mailed on Jun. 17, 2014, Worley III, "Integrated Augmented Reality Environment", 40 pages.

Office action for U.S. Appl. No. 12/982,519, mailed on Aug. 14, 2014, Worley III, "Complementing Operation of Display Devices in an Augmented Reality Environment", 12 pages.

Foscam User Manual, Model:FI9821W, retrieved at <<http://foscam.us/downloads/FI9821W%20user%20manual.pdf>>, May 2010, pp. 45-46 (71 pages).

Office Action for U.S. Appl. No. 12/975,175, mailed on Oct. 1, 2014, William Spencer Worley III, "Designation of Zones of Interest Within an Augmented Reality Environment", 36 pages.

Office Action for U.S. Appl. No. 12/977,760, mailed on Oct. 16, 2014, William Spencer Worley III, "Generation and Modulation of Non-Visible Structured Light", 11 pages.

Office Action for U.S. Appl. No. 13/236,294, mailed on Oct. 22, 2014, Christopher Coley, "Optical Interference Mitigation", 20 pages.

Office Action for U.S. Appl. No. 12/978,800, mailed on Dec. 2, 2014, William Spencer Worley III, "Integrated Augmented Reality Environment", 46 pages.

Office Action for U.S. Appl. No. 12/982,519, mailed on Mar. 5, 2015, William Spencer Worley III, "Complementing Operation of Display Devices in an Augmented Reality Environment", 13 pages.

Office Action for U.S. Appl. No. 12/982,519, mailed on Jul. 23, 2015, Worley III, "Complementing Operation of Display Devices in an Augmented Reality Environment", 18 pages.

Office action for U.S. Appl. No. 12/978,800, mailed on Jan. 5, 2016 Worley III et al., "Integrated Augmented Reality Environment", 62 pages.

Office action for U.S. Appl. No. 14/498,590 mailed on Oct. 17, 2015, Worley III et al., "Powered Augmented Reality Projection Accessory Display Device", 7 pages.

Office action for U.S. Appl. No. 12/982,519, mailed on Dec. 31, 2015 Worley III, "Complementing Operation of Display Devices in an Augmented Reality Environment", 26 pages.

Office action for U.S. Appl. No. 12/978,800, mailed on Aug. 27, 2015, Worley III et al., "Integrated Augmented Reality Environment", 51 pages.

\* cited by examiner

UTILIZING CONTENT OUTPUT DEVICES IN AN AUGMENTED REALITY ENVIRONMENT

RELATED APPLICATION

This application is related to U.S. patent application Ser. No. 12/977,924, filed on Dec. 23, 2010 and entitled "Characterization of a Scene with Structured Light," which is herein incorporated by reference in its entirety.

BACKGROUND

Augmented reality environments enable interaction among users and virtual or computer-generated objects. Within an augmented reality environment, interactions may include electronic input, verbal input, physical input relating to the manipulation of physical objects, and so forth. While augmented reality environments may provide custom display devices for creating the environment, these environments do not utilize existing infrastructure to complement these custom devices.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
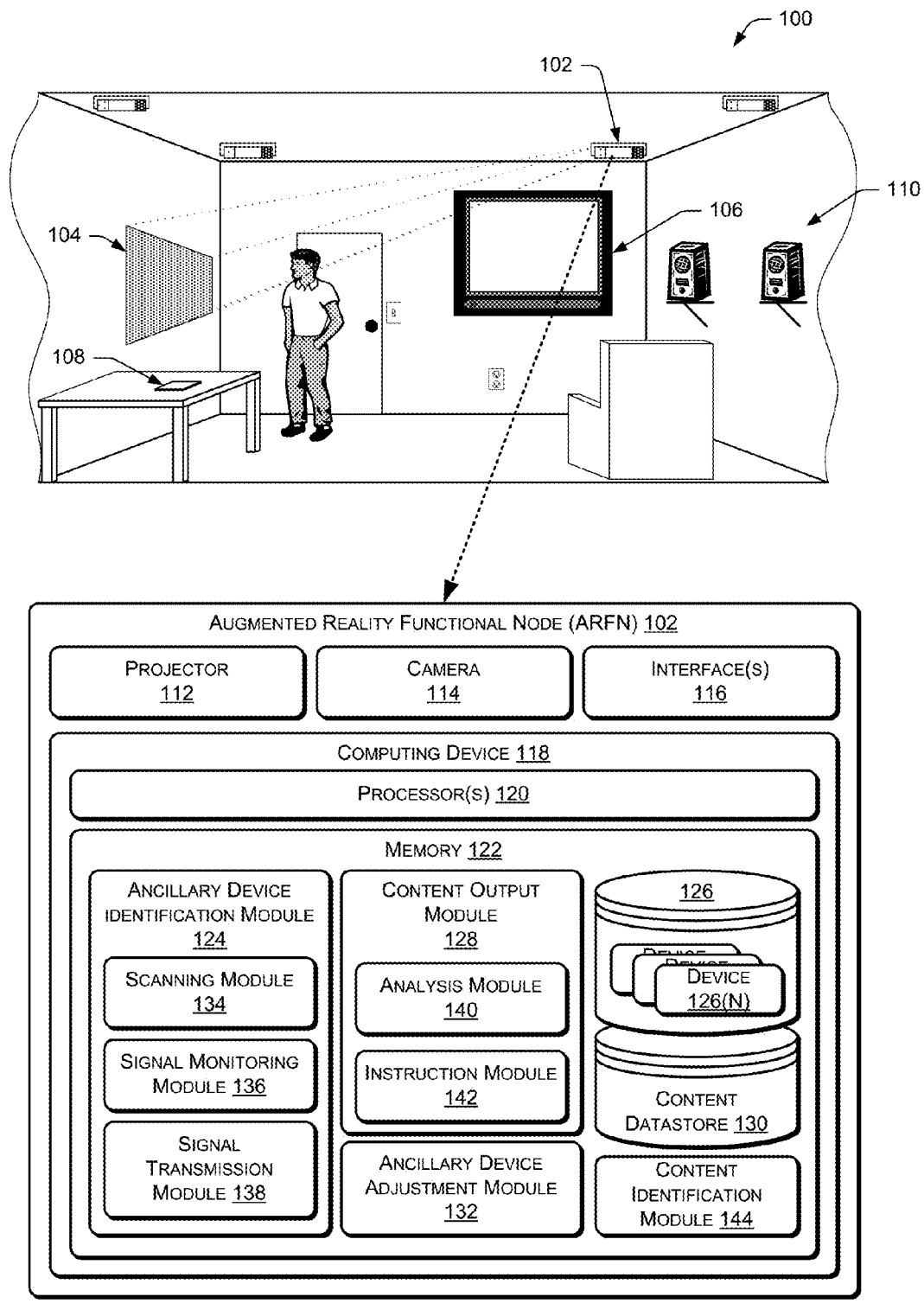
FIG. 1 depicts an example environment that includes an augmented reality functional node (ARFN) and multiple other output devices. Within this environment, the ARFN may identify the presence of the other output devices and cause these devices to output content for the purpose of enhancing a user's consumption of the content.

An augmented reality system may be configured to interact with objects within a scene and generate an augmented reality environment. The augmented reality environment allows for virtual objects and information to merge and interact with real-world objects, and vice versa.

In order to create this augment reality environment, the environment may include one or more augmented reality functional nodes (ARFNs) that are configured to project content onto different non-powered and/or powered display mediums. For instance, an ARFN may include a projector that projects still images, video, and the like onto walls, tables, prescribed stationary or mobile projection screens and the like. In addition, the ARFN may include a camera to locate and track a particular display medium for continuously projecting the content onto the medium, even as the medium moves. In some instances, the environment includes multiple ARFNs that hand off the projection of content between one another as the medium moves between different zones of the environment. In other instances, meanwhile, the ARFNs described herein may be free from any output devices, and may solely control other components in the environment to create the augment reality environment.

While the ARFN may project content within the environment as discussed above, the ARFN may also interactively control other components within the environment (e.g., other content output devices) to further enhance a user's experience while consuming the content. To provide an example, the ARFN may identify that a flat-screen television exists within the same environment as the ARFN (e.g., within a same room). In response, the ARFN may instruct the television to display certain content. For instance, if the ARFN is projecting a particular movie, this node may determine that a user viewing the movie would have a better viewing experience if the movie were displayed on the television. As such, the ARFN may stream or otherwise provide an instruction to the television to begin displaying the movie. By doing so, the user is now able to view the previously projected content on a display device (here, the television) that is better suited for outputting the content.

To provide another example, envision that the ARFN projects an electronic book (eBook), such as one of the books of the "Harry Potter" series by J. K. Rowling, for a user within the environment. Envision also that the ARFN again identifies the presence of the television as described above. In response, the ARFN may instruct the television to display a trailer for the particular Harry Potter movie that is based on the eBook that the ARFN currently projects. In response, the television may begin displaying the trailer and, as such, the user is able to view the trailer that is associated with the eBook that the user currently reads.

In yet another example, envision that the ARFN identifies a stereo system that resides within the environment. In the example above, the ARFN may instruct the stereo system to output a song or other audio associated with the eBook that the ARFN currently projects. As such, the user may enjoy the soundtrack to "Harry Potter" while reading the projected Harry Potter eBook.

Furthermore, the ARFN may utilize multiple display devices in some instances. For instance, the ARFN may instruct the television to the display the trailer for "Harry Potter" while instructing the stereo system to output the audio associated with this trailer. While a few example output devices have been discussed, it is to be appreciated that the ARFN may utilize any number of other output devices capable of outputting content that the ARFN projects, content that is supplemental to the projected content, or any other form of content.

In addition, the ARFN may identify and utilize other devices within the environment for the benefit of the user within the environment. For instance, envision that a camera of the ARFN identifies when the user wakes up in the morning. Having learned the user's routine of making coffee shortly after waking up, the ARFN may send an instruction to the coffee maker to begin its brewing process, even before the user has made his way to the kitchen. In another example, the ARFN may identify (e.g., via the camera) when the user returns home from work in the evening. In response, the ARFN may instruct the oven to turn on to a certain pre-heated temperature in anticipation of the user using the oven to cook dinner Again, while a few examples have been described, the ARFN may work in unison with any device within the environment and capable of communicating with the ARFN directly or indirectly, as described below.

In addition or as an alternative to utilizing existing output devices in an environment to complement operation of the ARFN, the ARFN may itself complement the operation of the existing output devices. For instance, the ARFN may identify existing output devices using any of the techniques discussed briefly above. Furthermore, the ARFN may identify any content that these output devices currently output. For instance, a camera of the ARFN may capture images of a sporting event or a movie that a television outputs and, with these images, the ARFN may identify the content.

In response to identifying the content, the ARFN may either take over the display of the content when appropriate, or may project related content. For instance, the ARFN may determine whether it should project the sporting event being displayed by the television in the above example. The ARFN may make this determination with reference to characteristics of the content, characteristics of the television, characteristics of the projector, preferences of a user in the room, in response to receiving an explicit instruction, or the based on any other factor or combinations of factors. After making this determination, the ARFN may begin projecting the content and may, in some instances, instruct the television to cease the display of the content. In some instances, the ARFN may receive the content from the television, from a content provider that was providing the content to the television, or from another content provider.

In another example, meanwhile, the ARFN may project content that is related to the output content. For instance, at least partly in response to determining that the television is displaying a particular sporting event, the ARFN may retrieve and project content that is related (e.g., supplemental) to the event. For instance, the ARFN may navigate to a website to retrieve and project statistics associated with the teams that the television currently displays. For instance, the ARFN may identify players that are being televised on the television and that are on a fantasy sports team of a user viewing the sporting event. The ARFN may, in response, retrieve statistics of these players during the game being televised, during the season, or the like. These statistics may include the number of fantasy points that these player(s) have acquired, or any other type of statistic. Additionally or alternatively, the ARFN may begin playing audio associated with the sporting event or may supplement the display of the event in any other way.

The detailed discussion below begins with a section entitled "Example Augmented Reality Environment," which describes one non-limiting environment that may implement the described techniques for utilizing existing output devices within an environment. A section entitled "Example Output Device Utilization" follows and describes several examples where an ARFN from FIG. 1 may use identified devices to output previously-projected content or to supplement the projected content. Next, a section entitled "Example Aug-mented Reality Functional Node (ARFN)" provides additional details regarding an example ARFN that the previously-described environment may implement. A section entitled "Example Processes" follows, before a brief conclusion ends the discussion. This brief introduction, including section titles and corresponding summaries, is provided for the reader's convenience and is not intended to limit the scope of the claims, nor the proceeding sections.

Example Augmented Reality Environment

FIG. 1 shows an illustrative augmented reality environment 100 that includes at least one augmented reality functional node (ARFN) 102. In this illustration, multiple ARFNs 102 are positioned in the corners of the ceiling of the room, although in other implementations the ARFNs 102 may be positioned in other locations within the environment 100. Further, while FIG. 1 illustrates four ARFNs 102, other embodiments may include more or fewer nodes.

As described briefly above, the ARFN 102 may function to project content onto different display mediums within the environment 100, as well as identify other output devices within the environment to utilize for outputting this content or to otherwise supplement the projected content. FIG. 1, for instance, illustrates that the ARFN 102 may project any sort of visual content (e.g., eBooks, videos, images, etc.) onto a projection area 104. While the projection area 104 here comprises a portion of the wall, the projection area 104 may comprise the illustrated table, chair, floor, or any other illustrated or non-illustrated surface within the environment 100. In some instances, the illustrated user may carry a prescribed powered or non-powered display medium that the ARFN 102 tracks and project content onto.

In this example, the environment 100 further includes a television 106, a tablet computing device 108, and stereo system 110. As described in detail below, the ARFN 102 may identify each of these output devices and may utilize one or more of these devices for outputting the previously-projected content, for outputting content that is supplemental to the projected content, and/or to output any other form of content. While FIG. 1 illustrates the television 106, the tablet 108, and the stereo system 110, in other embodiments the ARFN 102 may identify and utilize a mobile phone, a laptop computer, a desktop computer, an electronic book reader device, a personal digital assistant (PDA), a portable music player, and/or any other computing, display, or audio device configured to output content visually, audibly, tactilely, or in any other manner.

As illustrated, the ARFN 102 includes a projector 112, a camera 114, one or more interfaces 116, and a computing device 118. Some or all of the components within the ARFN 102 may couple to one another in a wired manner, in a wireless manner, or in any other way. Furthermore, while FIG. 1 illustrates the components as residing adjacent to one another, some or all of the components may reside remote from one another in some instances.

Turning to these components, the projector 112 functions to project content onto a projection surface 104, as described above. The camera 114, meanwhile, may be used to track a mobile projection surface, to identify the devices within the environment, to identify user behavior, and the like, as described below.

The interfaces 116 may enable the components within the ARFN 102 to communicate with one another, and/or may enable the ARFN 102 to communicate with other entities within and outside of the environment 100. For instance, the interfaces 116 may include wired or wireless interfaces that allow the ARFN to communicate with the devices 106, 108, and 110 over a local area network (LAN), a wide area network (WAN), or over any other sort of network. The ARFN 102 may communicate directly with these devices (e.g., wired or wirelessly), or may communicate with this devices via third party devices, such as set-top boxes, content providers that communicate with the devices, and the like. Furthermore, the interfaces 116 may allow the ARFN 102 to receive content from local or remote content providers for the purpose of projecting or otherwise outputting this content, or for sending the content to other devices in the environment 100.

As illustrated, the ARFN may include or otherwise couple to the computing device 118. This computing device 118 may reside within a housing of the ARFN 102, or may reside at another location. In either instance, the computing device 118 comprises one or more processors 120 and memory 122. The memory 122 may include computer-readable storage media ("CRSM"), which includes any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

The memory 122 may store several modules such as instructions, datastores, and so forth, each of which is configured to execute on the processors 120. While FIG. 1 illustrates a few example modules, it is to be appreciated that the computing device 118 may include other components found in traditional computing devices, such as an operating system, system buses, and the like. Furthermore, while FIG. 1 illustrates the memory 122 as storing the modules and other components, this data may be stored on other local or remote storage devices that area accessible to the computing device 118 via a local network, a wide area network, or the like. Similarly, the processors 120 may reside locally to one another, or may be remote from one another to form a distributed system.

As illustrated, the memory 122 may store or otherwise have access to an ancillary device identification module 124, a datastore 126 storing indications of one or more identified devices 126(1), . . . , 126(N), a content output module 128, a content datastore 130, and an ancillary device adjustment module 132.

The ancillary device identification module 124 functions to identify devices within the environment 100 that may be available for outputting content in lieu of, or in addition to, the ARFN 102. For instance, in this example, the ancillary device identification module 124 may function to identify the television 106, the table device 108, and the stereo system 110. Furthermore, in some instances, the module 124 may identify devices that reside outside of the environment 100.

The module 124 may identify these devices in any number of ways. The scanning module 134, for instance, may work in combination with the camera 114 to scan the environment 100 for the devices. The camera 114 may seek unique identifiers associated with the devices and may pass these identifiers back to the scanning module 134 for identification of a device. For instance, one or more of the devices within the environment 100 may include a unique bar code, serial number, brand/model name, and/or any other identifier that the camera may read and pass back to the scanning module 134.

In response to receiving a unique identifier, the scanning module 134 may attempt to determine the identity of the device and, in some instances, one or more characteristics of the device. For instance, if the camera reads and returns a unique bar code on the television 106, the scanning module may map this bar code to the make and model of the television. With this information, the ancillary device module 124 may determine one or more characteristics of the television 106, such as a resolution of the display of the television, a size of the display, a type of the display (e.g., LCD, etc.) and the like.

In addition, the camera 114 may also provide an indication of the television's location within the room. The ancillary device identification module 124 may then store this information in association within the device in the datastore 126. That is, the module 124 may store the determined characteristics of the television 106 in the datastore 126, thereby allowing the ARFN to later reference information associated with the television 106 when determining whether to utilize another device for outputting content.

In another example, the camera 114 may read a brand name on a device, such as the television 106, and may pass this brand name back to the scanning module 134. In addition, the camera 114 and the scanning module 134 may together estimate dimensions of the television 106 with reference to objects of known size within the room, and/or utilizing any of the structured light techniques described in the related application incorporated by reference above. The camera 114 and the scanning module 134 may also identify any other salient features that may help in identifying the television 106, such as the color of the television, the layout of the controls, and the like. Using the brand name, the estimated dimensions, and/or other aggregated information, the scanning module 134 may determine or deduce the identity of the television 106.

In some instances, the scanning module 134 may make this determination by comparing the aggregated information with information accessible via the interfaces 116. For instance, the scanning module 134 may access, via the interfaces 116, a website associated with the identified brand name to compare the estimated dimensions and the like against models described on the site. The module 134 may then identify a particular model based on this comparison. Furthermore, and as discussed above, the module 134 may store this identification in the datastore 126 for later access by the ARFN 102.

In addition or in the alternative, the ancillary device identification module 124 may identify the devices within the environment 100 with use of the signal monitoring module 136. The signal monitoring module 136 may attempt to monitor or listen for signals sent to or from devices within the environment. For instance, if a device is controllable via a remote control, the module 136 may monitor signals sent between the remote the control and the corresponding device to help identify the device.

In one example, the illustrated user may control the television 106 via a remote control that sends infrared or another type of wireless signal to the television 106 for operating the television 106. The signal monitoring module 136 may monitor these wireless signals and may use these unique signals to deduce the identity of the television 106. In some instances, the ancillary device identification module 124 may utilize the monitored signals, the images captured by the camera 114, and/or other information to best deduce the most likely identity of the device, such as the television 106.

Further, the ancillary device identification module 124 may utilize the signal transmission module 138 to identify the devices within the environment 100. The signal transmission module 138 may send signals (e.g., infrared or other wireless signals) to the device in an attempt to elicit a response from the device. When a device does respond, the module 138 may determine the identity of the device based at least in part on which of the transmitted signals successfully elicited the response.

For instance, the signal transmission module 138 may send multiple different infrared signals to the television 106 in attempt to turn on the television 106 when it is currently off, or to otherwise control the television in an identifiable manner. For instance, the module 138 may reference a manual of known signals used by different brands and/or models to determine with signal the television 106 responds to. Each of these signals may be sent at a different frequency or may be encoded uniquely. Upon successfully turning on the television 106 with use of a transmitted infrared signal, the module 138 may map this signal back to a particular make and/or model of device. The module 138 may then store this device identification in the datastore 126, as discussed above.

Figure 2:
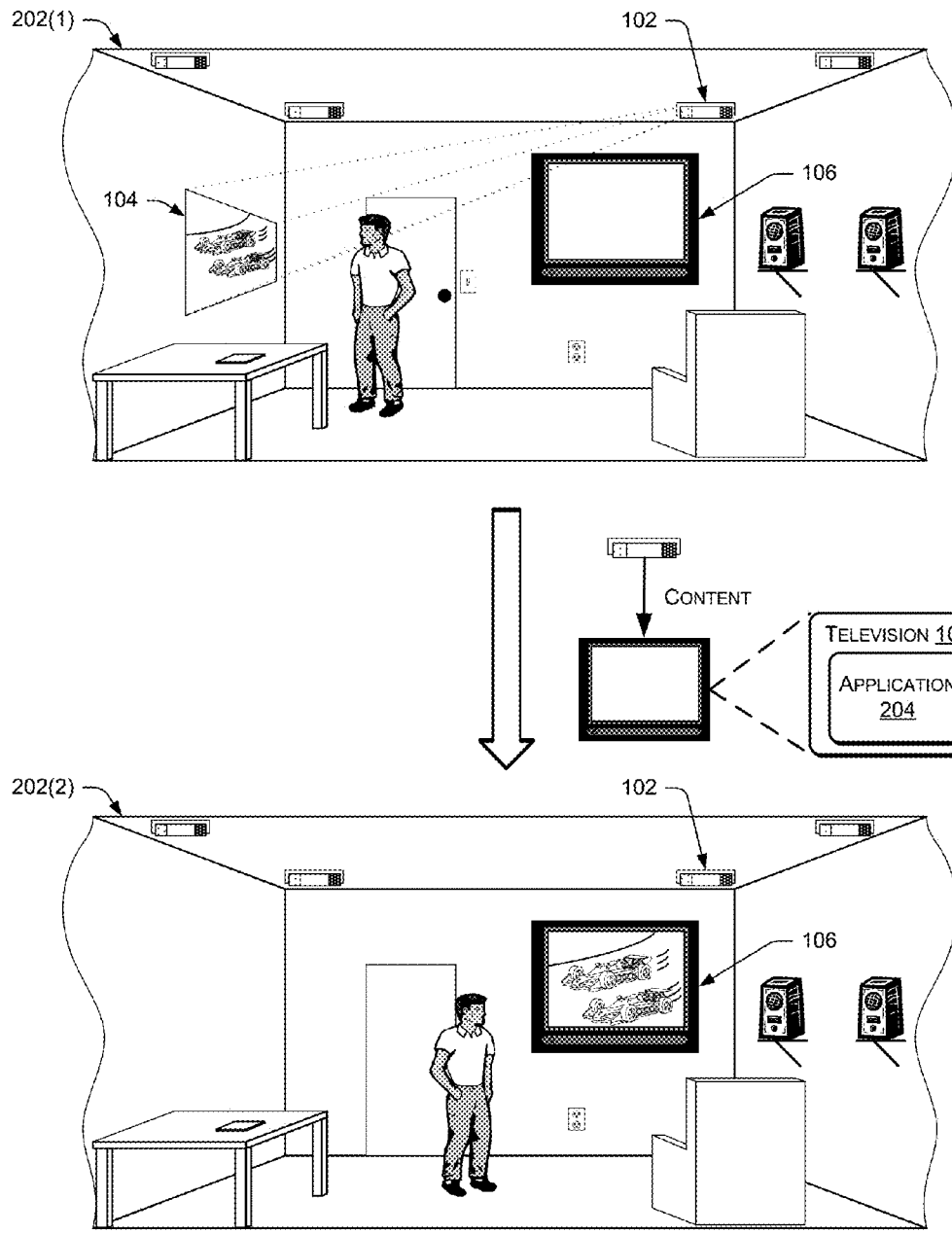
FIG. 2 depicts the environment of FIG. 1 when the ARFN initially projects content onto a display medium, before transitioning the display of the content to a television that the ARFN has identified as residing within the environment.
Figure 3:
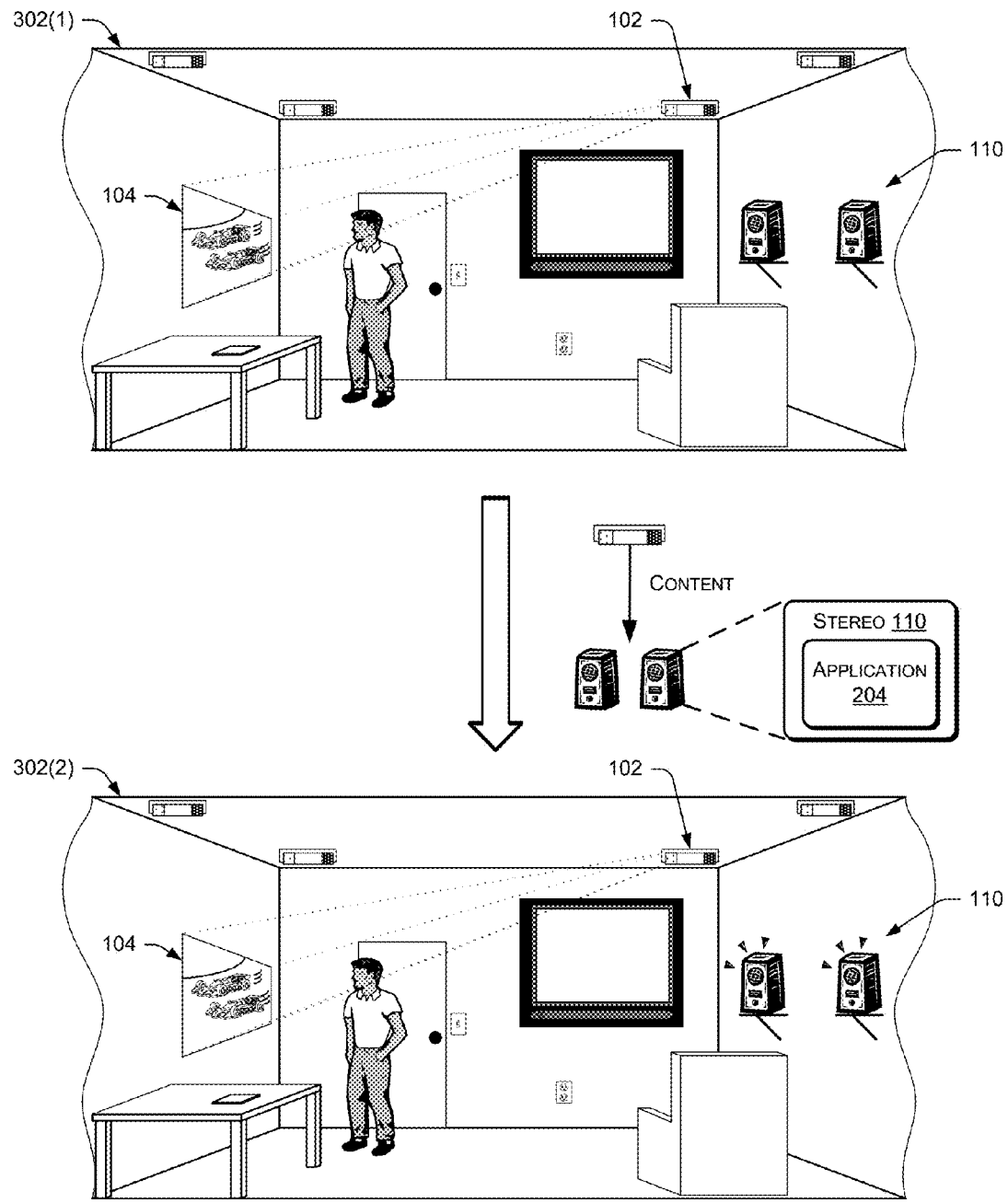
FIG. 3 depicts the environment of FIG. 1 when the ARFN again projects content onto a display medium. In this example, however, the ARFN has identified the presence of a stereo system and, therefore, sends audio content for output by the stereo system to supplement the user's consumption of the projected content.

While a few example modules have been illustrated, it is to be appreciated that the ancillary device identification module 124 may identify the devices in any other number of ways. For instance, a user of the ARFN 102 may explicit identify the devices, or the devices may include applications for sending their identifications to the ARFN 102. For instance, a user may download an application to each of her output devices in the environment, with the application functioning to determine the identity of the corresponding device and send this information to the ARFN 102 for storage in the datastore 126. FIGS. 2-3 illustrate and describe such an application in further detail.

After identifying the devices that are within the environment 100 and available for use, the content output module 128 may utilize these devices to output content when appropriate. As illustrated, the content output module 128 may access content stored in the content datastore 130 for outputting on the projector 112 and/or on one of the devices within the environment 100 identified in the datastore 126. This content may be persistently stored in the content datastore 130, or the content may comprise data that is being streamed or otherwise provided "on demand" to the ARFN 102. The content may comprise eBooks, videos, songs, images, pictures, games, productivity applications, or any other type of content that the illustrated user may consume and/or interact with.

In addition or in the alternative to outputting this content via the projector 112, the content output module 128 may utilize one or more of the devices identified in the datastore 130. As such, the module 128 stores or otherwise has access to an analysis module 140 and an instruction module 142. The analysis module 140 functions to determine when it is appropriate to utilize one of the output devices identified in the datastore 126, while the instruction module 142 functions to instruct the devices to output content in response to such a determination.

The analysis module 140 may determine to utilize one of the other output devices in any number of ways. For instance, the user within the environment may explicitly instruct the ARFN 102 to utilize one of these devices. For example, envision that the ARFN 102 is projecting a movie onto a wall of the environment 100, and that the user requests to switch the output to the television 106 and the stereo system 110. In response, the content output module 140 may cease the projecting of the content and the instruction module 142 may instruct the television 106 and the stereo system 110 to begin outputting the visual and audio components of the movie, respectively. In response, the television 106 may begin displaying the movie and the speakers may begin outputting the audio content of the movie at a location where the projecting of the movie left off. In some instances, the user may provide this instruction via a gesture received by the camera 114, via a physical control (e.g., a remote control) used to operate the ARFN 102, via a sound command (e.g., a voice command from a user) received by a microphone of the ARN 102, or in any other suitable way.

In yet another instance, the analysis module 140 may determine to utilize an output device other than the projector 112 with reference to the content and/or with reference to characteristics of the available devices themselves. For instance, when the ARFN 102 identifies the presence of the television 106, the ARFN 102 may determine one or more display characteristics (e.g., size, resolution, etc.) of the television 106, as discussed above. When projecting a movie or in response to receiving a request to project a movie, the analysis module may compare these characteristics (e.g., the display characteristics) to characteristics of the projector 112 and potentially to other devices in the environment 100. Based on this comparison, the analysis module 140 may determine which device or combination of devices is best suited for outputting the content. In the movie example, the ARFN may determine that the television 106 and the stereo system 110 together are best suited to output the movie and, in response, the instruction module 142 may instruct these devices to do so.

In still another example, the content being projected itself may include an instruction to utilize one or more of the other devices within the environment 100. For instance, envision that the projector 112 currently projects an eBook "Harry Potter" that the user within the environment 100 is reading. This eBook may include an instruction to play a clip of the movie "Harry Potter" when the user reaches a particular scene. Or, the content may include an instruction to play the Harry Potter theme song upon the user finishing the book. In yet another example, the user may request to transition from projecting of the eBook to playing an audio version of the eBook via the stereo system 110. Or, the user may be leaving the environment (e.g., going outside for a walk) and, hence, may request that the eBook be sent to the tablet device 108 that communicates with the ARFN 102, or another content provider that provides the content, via a wide area network (e.g., a public WiFi network, a cellular network, etc.), or the like.

In still other instances, the ARFN 102 may monitor current conditions within the environment (e.g., with use of the camera 114, microphones, etc.) to determine whether to project the content and/or utilize an existing output device. This may include measuring ambient light in the environment 100, measuring a glare on the screen of the television 106 or other output device, or any other environmental condition.

While a few examples have been described, the analysis module 140 may determine to utilize ancillary output devices based on the occurrence of multiple other events and based on multiple other factors. For instance, the ARFN 102 may decide to utilize ancillary output devices—or may refrain from doing so—based on a size of a display, a resolution of a display, a location of a display, current ambient lighting conditions in the environment, potentially environmental obstructions that could obstruct the projection of the content or the user's viewing of the content on an ancillary output device, and/or any other factor or combination of factors.

Further, in some embodiments the ARFN 102 may supplement the projected content with supplementary information, such as advertisements, as discussed above. The use of advertisements may offset some of the cost of the content, potentially saving the user money if he purchases the content. Therefore, in some instances the use of additional advertisements—and the potential savings realized there from—may push the balance in favor of projecting the content rather than displaying it on the ancillary output device.

In each instance, the instruction module 142 may send an instruction to the particular device via the interfaces 116, instructing the device to begin outputting certain content. In some instances, the ARFN 102 and the devices (e.g., the television 106, the tablet device 108, the stereo system 110, etc.) may directly couple to one another in a wired or wireless manner. In this instance, the instruction module 142 may send the instruction over this direct connection. In other instances, meanwhile, the instruction module 142 may send the instruction to a third party device, such as to a local set-top box that controls operation of the television 106, to a remote satellite provider that controls operation of the television 106, and the like.

In some instances, the instruction module 142 includes the content along with the request. For instance, when transitioning from projecting a movie to displaying the movie on the television 106, the module 142 may stream the content from the content datastore 130 directly to the television 106. For example, the ARFN 102 may utilize an auxiliary input that allows the ARFN 102 to cause output of content on the device, such as the television 106. In one specific example, the ARFN 102 could send content via a wireless HDMI connection or via an RF HD broadcast. In the latter instances, the ARFN 102 may broadcast the content at a power level that complies with regulatory requirements.

In other instances, meanwhile, the module 142 may refrain from sending the content to the ancillary output device, such as the television 106, but may instead send an instruction to the device or the third party device for the output device to obtain the content. In one example, the module 142 may operate the ancillary content device to obtain the content. For instance, the module 142 may turn on the television 106 and change the input channel to the channel displaying the appropriate content (e.g., the correct movie, show, etc.).

Finally, FIG. 1 illustrates that the ARFN 102 may include or have access to the ancillary device adjustment module 132. The module 132 may function to automatically adjust devices within the environment similar to how a technician may adjust such devices. For instance, upon sending content to the television 106, the module 132 may adjust settings of the television 106, such as brightness, contrast, volume, and the like. By doing so, the ARFN 102 is able to optimize settings associated with the devices in the environment 100, as well as potentially tailor these settings based on the content being output and preferences of the users consuming the content.

Furthermore, in addition to the devices 106, 108, and 110 supplementing the operation of the ARFN 102, the ARFN 102 may act to supplement the operation of these devices 106, 108, and 110. For instance, the ARFN 102 may utilize the projector 112 to project content in lieu of or along with one of these devices within the environment 100. In one example, the ARFN 102 may instruct the projector 112 to project content previously output by one of the other devices 106, 108, or 110. As such, the ARFN 102 may also instruct the device previously outputting the content to cease doing so. Additionally or alternatively, the ARFN 102 may instruct the projector 112 to project content that is related to the content being output by one of the other devices 106, 108, or 110, as discussed below.

To complement the operation of the devices 106, 108, and/or 110 in this manner, the ARFN 102 may identify the devices in any of the ways described above. For instance, the camera 114 may scan the environment to identify the devices, the user within the environment 100 may explicitly identify the devices to the ARFN 102, the devices themselves may send their identities to the ARFN 102, and the like.

Furthermore, the memory 122 of the ARFN 102 may store a content identification module 144 that functions to identify the content being output by one or more of the devices identified in the datastore 126. The content identification module 144 may identify this content in any number of ways. For instance, in one example, the camera 114 may scan content output devices that display visual content, such as the television 106, the tablet computing device 108, and the like. In doing so, the camera 114 may capture images that these devices display and may provide these images to the content identification module 144.

In response to receiving these images, the module 144 may compare these images to images associated with known content to find a match and identify the content. For instance, the module 144 may send the received images of the displayed content to a web service or other entity that may match the content to known content. Alternatively, the module 144 may send the images (e.g., in the form of video) to a group of one or more human users that may identify the content.

In another example, the camera 114 may scan the environment 100 to identify visual indications that can be mapped to the content being output. For instance, the camera 114 may capture an image of a set-top box that controls the television 106, where the set-top box visually indicates a television channel that this user in the environment is currently watching. The content identification module 144 may then map this channel to identified content, such as with reference to a channel listing of television content. To provide another example, the camera 114 may capture images of a receiver of the stereo system 110, where the receiver visually indicates a name of a song or artist that the stereo system currently plays. The content identification module 144 may then identify the content with use of these images.

In another example, a microphone of the ARFN (illustrated below with reference to FIG. 5) may capture audio content and provide this to the module 114. The content identification module 144 may then attempt to match this audio content to known audio content to make the identification. In yet another example, the camera 114 may capture images of a remote control being used by a user within the environment to control the output device, such as the television 106. The ARFN 102 may use these captured images to identify the output device itself, as well as the content being output. For instance, using the television 106 as an example, the camera 114 may capture the sequence of buttons that the user pushes in order to deduce the channel that the television 106 is currently displaying. Furthermore, the ARFN 102 may use a collection of this information in unison to deduce the identity of the content being output.

In still other instances, the output device (e.g., the television 106) or a device coupled to the output device (e.g., the set-top box) may inform the ARFN 102 directly of the content being output. Additionally or alternatively, the user within the environment may provide this identification to the ARFN 102.

Regardless of how the content identification module 144 identifies the content, the content output module 128 may selectively instruct the projector 112 to project the content being output by the output device (e.g., the television 106) or content that is related to the content being output by the output device. For instance, the content output module 128 may determine one or more characteristics (e.g., display characteristics) of the content output device and may determine, based on these characteristics, if the viewing experience of the user would be enhanced by projecting all or part of the content via the projector 112. That is, the module 128 may determine whether the projector 112 is better suited to output the content and, if so, may instruct the projector 112 to project the content (in whole or in part).

In other instances, the content output module 128 may reference a characteristic of the content to determine whether the projector is better suited to output the content. For instance, if the television is displaying a static image, the content output module 128 may determine that it is more cost effective and equally suitable in terms of quality to project this static image. Of course, the converse may be true in other instances. Furthermore, without regard to the type of the content, the content output module 128 may identify whether the identified content can be obtained in a more cost-effective manner after identifying the content. For instance, if the user is watching a particular movie, the content output module 128 may identify multiple content providers that provide the same or similar movies, as well as the cost charged by each provider. The ARFN 102 may then output a less expensive version of the movie in response, or may suggest to the user to consider the less expensive content provider when obtaining movies in the future (e.g., in the event that the user has already paid for the movie that is currently being displayed).

In still other instances, the content output module 128 may identify a user within the environment 100 with use of images received by the camera 114. Conversely, the user may provide an indication of his presence within the environment 100. In either instance, the content output module 128 may identify and reference a preference of the particular user when deciding whether to project the content. For instance, different users may set up different preferences regarding when to switch the output of content to the projector 112. In each of these instances, the content output module 128 may allow the content output device within the environment 100 (e.g., the television 106) to continue outputting the content, or the module 128 may instruct the device to cease outputting the content. For instance, the content output module 128 may turn off the television 106 (e.g., via an infrared or other wireless signal).

In some instances, the content output module 128 may instruct the projector 112 to project content that is related to the content being output by the output device—instead of or in addition to projecting the content previously output by the content output device. For instance, in response to the content identification module 144 identifying the content, the content output module 128 may retrieve related content via the interfaces 116. In some instances, the content output module 128 may request and retrieve content from a content provider that is different than the content provider that provides the identified content (e.g., the content being displayed by the television 106). For instance, if the television 106 displays a sporting event, the content output module 128 may request and retrieve content from a website that stores statistics or other types of information related to the sporting event. The content output module 128 may then instruct the projector 112 to project this supplemental information for the purpose of enhancing a viewing experience of the user within the environment 100.

In other instances, meanwhile, the related content may comprise one or more advertisements. These advertisements may or may not be associated with items displayed or otherwise output on the content output device. For instance, if the ARFN 102 determines that the stereo system 110 is playing a song by a certain artist, the ARFN 102 may instruct the projector 112 to project an advertisement to purchase the song or the album, or may project another advertisement associated with the song that is currently playing. In another example, the ARFN 102 may determine that the television 106 is playing a certain movie or show. In response, the ARFN 102 may project, output audibly, or otherwise output an advertisement that is associated with the content being output. This may include an advertisement to purchase or obtain the movie or show itself, to purchase or obtain items in the movie or show, or an advertisement for any other type of item (e.g., a product or service) that is associated with the displayed content.

Conversely, the ARFN 102 may utilize the other content output devices in the environment for outputting these types of advertisements. For instance, when the projector 112 projects certain content, the ARFN 102 may provide an instruction to one or more of the devices 106, 108, and 110 to output an advertisement that is related to the projected content. For instance, if the projector 112 projects a sporting event, the ARFN 102 may instruct the television to display an advertisement for purchasing tickets to future games, for sports memorabilia associated with the teams currently playing in the sporting event, or the like.

Example Output Device Utilization

FIG. 2 depicts the environment 100 when the ARFN 102 projects content onto the projection surface 104 and then transitions the display of the content to the example television 106.

As illustrated, at 202(1), the ARFN 102 projects content onto the projection surface 104. Here, the projection surface 104 comprises a portion of the wall within the environment 100. During this projection, the ARFN 102 decides to transition the projecting of the content to another device within the environment 100, and namely to the television 106. For instance, the ARFN 102 may have received a request from the user, may have received a request from the content, may have identified the presence of the television 106, or may have decided to transition the content for any other reason. In one example, the ARFN 102 may have determined that the user's viewing experience will likely be enhanced by presenting the content on the television 106 rather than via the projector 112.

Between 202(1) and 202(2), FIG. 2 illustrates that the ARFN 102 instructs the television 106 to begin displaying the previously-projected content. As illustrated, the television 106 may have been configured to communicate with the ARFN 102 via an application 204, or the ARFN 102 may simply communicate with the television 106 via means that the television 106 provides off the shelf. For instance, the ARFN 102 may communicate with the television 106 via infrared signals and may provide the content to the television 106 via an HDMI or another input channel that the television 106 provides natively.

At 202(2), the ARFN 102 has turned on the television 106 and has begun causing display of the content. The ARFN 102 may stream the content directly to the television 106, the ARFN 102 may configure the television 106 to play the content (e.g., by tuning the television 106 to an appropriate channel), or the ARFN 102 may instruct a third party device (e.g., associated with a satellite provider, etc.) to play the content on the television 106. In each of these instances, the ARFN 102 has successfully transitioned from projecting the content to displaying the content on the television 106, which may provide better display characteristics that enhance the user's viewing of the content.

FIG. 3 depicts another example of the ARFN 102 utilizing existing output devices within the environment 100. At 302(1), the ARFN 102 again projects content onto the projection surface 104. Thereafter, the ARFN 102 determines to utilize the stereo system 110 within the environment 100 for the purpose of providing better audio output for the content that the user is currently consuming. As such, between 302(1) and 302(2), the ARFN 102 instructs the stereo system 110 to output the content associated with the projected content. Similar to the television 106, the stereo system 110 may store the application 204 that allows that stereo system to communicate with the ARFN 102. In other instances, however, the ARFN 102 may communicate with the stereo system 110 using components that are native to the stereo.

At 302(2), the stereo system 110 outputs the audio content associated with the projected content. As such, the ARFN 102 is able to supplement the projected content using the stereo system 110 residing within the environment 100.

Figure 4:
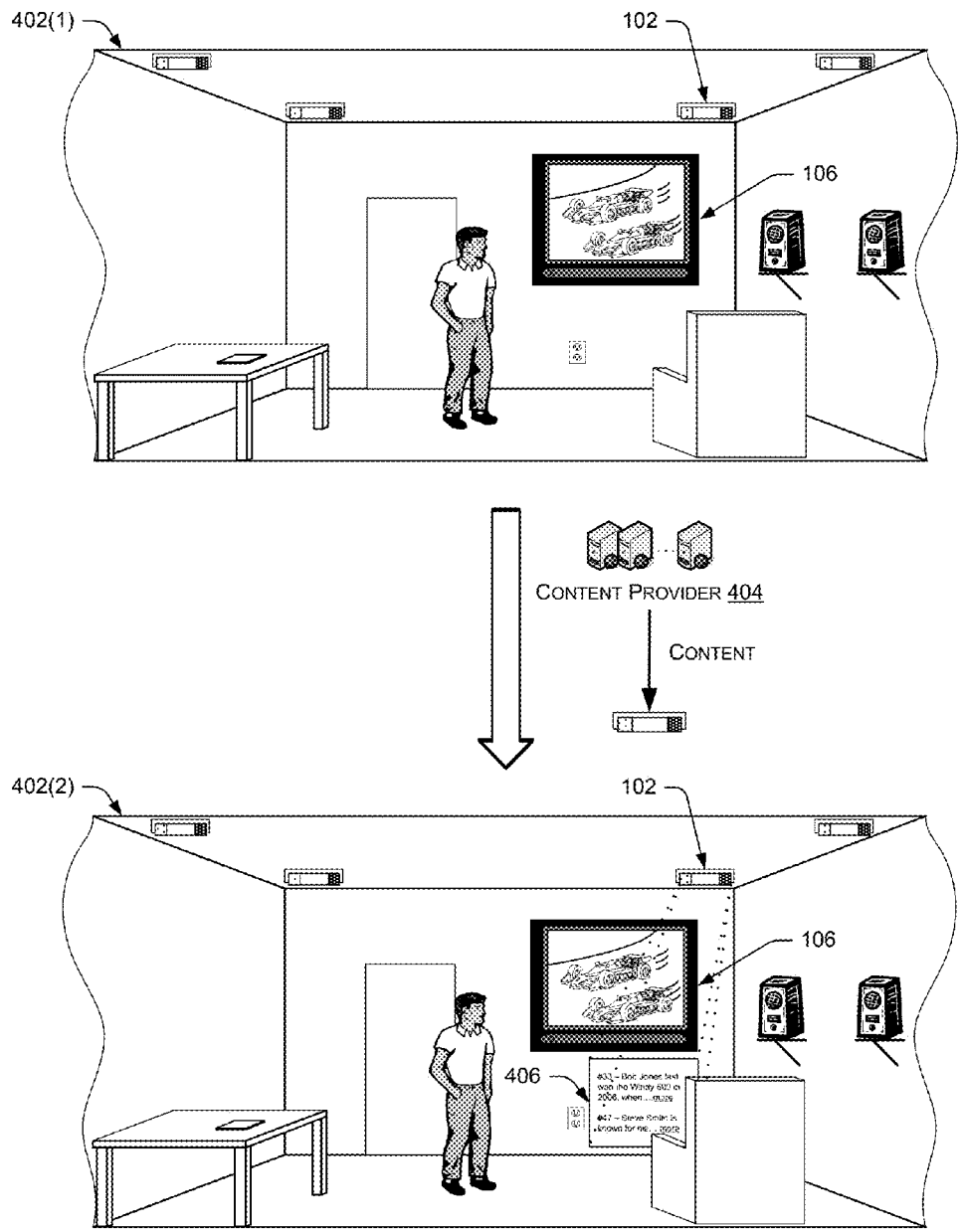
FIG. 4 depicts the environment of FIG. 1 when the user is viewing the television described above. Here, the ARFN detects the content that the user is viewing on the television and, in response, begins projecting supplemental content on a projection surface.

FIG. 4 depicts an example of the ARFN 102 supplementing the operation of existing output devices within the environment 100. Here, at 402(1), the user watches content on the television 106. In response, the ARFN 102 may identify the content that the television is currently displaying. The ARFN 102 may identify the content in a variety of ways as described above. For instance, the camera 114 may capture images of the content and may compare this to known content. Conversely, the camera 114 may read a set-top box coupled to the television 106 that displays the channel that the user currently views, or may learn of the channel that the user is watching by communicating directly with set-top box or the television 106. In yet another example, the user himself may inform the ARFN 102 of the content that the television 106 currently displays.

In each of these instances, between 402(1) and 402(2), the ARFN 102 may utilize the interfaces 116 to retrieve content that is associated with and supplemental to the content that the television 106 currently displays. For instance, the ARFN 102 may communicate with a content provider 404, which may comprise a website or any other entity that stores information related to the currently broadcast content.

At 402(2), the ARFN projects the supplemental content onto a projection surface 406 using the projector 112. In this example, the television 106 displays a car race and, in response, the ARFN 102 retrieves and projects information regarding the cars and the drivers of the cars that the television 106 currently displays. As such, the user is able to learn information about the cars and the drivers in addition to the information being broadcast on the television 106. Furthermore, and as discussed above, the supplemental content may comprise advertisements that are associated with the content on the television 106. For instance, the ARFN 102 may identify that one of the cars is sponsored by "Clorox®". In response, the ARFN 102 may retrieve and project an advertisement for Clorox, a competitor of Clorox, and/or any other associated product or service.

Example Augmented Reality Functional Node (ARFN)

Figure 5:
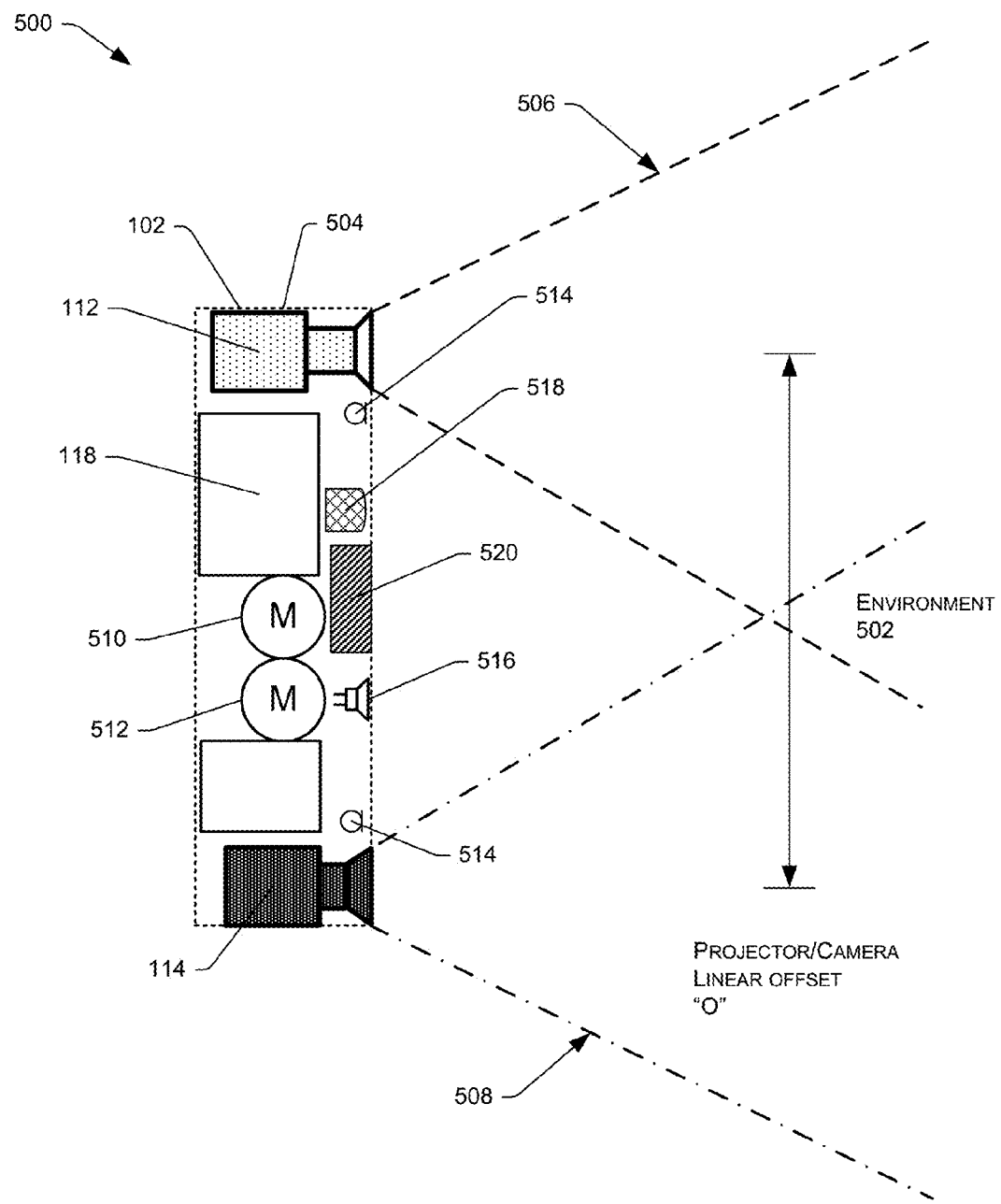
FIG. 5 shows an example augmented reality functional node and selected components.

FIG. 5 shows an illustrative schematic 500 of the ARFN 102 and selected components. The ARFN 102 is configured to scan at least a portion of an environment 502 and the objects therein, as well as project content, as described above.

A chassis 504 is configured to hold the components of the ARFN 102, such as the projector 112. The projector 112 is configured to generate images, such as visible light images perceptible to the user, visible light images imperceptible to the user, images with non-visible light, or a combination thereof. This projector 112 may comprise a digital micromirror device (DMD), liquid crystal on silicon display (LCOS), liquid crystal display, 3LCD, and so forth configured to generate an image and project it onto a surface within the environment 502. For example, as described herein, the projector may be configured to project the content illustrated in FIGS. 1-4.

The projector 112 has a projector field of view 506 which describes a particular solid angle. The projector field of view 506 may vary according to changes in the configuration of the projector. For example, the projector field of view 506 may narrow upon application of an optical zoom to the projector. In some implementations, the ARFN 102 may include a plurality of projectors 112.

A camera 114 may also reside within the chassis 504. The camera 114 is configured to image the scene in visible light wavelengths, non-visible light wavelengths, or both. The camera 114 has a camera field of view 508, which describes a particular solid angle. The camera field of view 508 may vary according to changes in the configuration of the camera 114. For example, an optical zoom of the camera may narrow the camera field of view 508. In some implementations, the ARFN 102 may include a plurality of cameras 210.

The chassis 504 may be mounted with a fixed orientation, or be coupled via an actuator to a fixture such that the chassis 504 may move. Actuators may include piezoelectric actuators, motors, linear actuators, and other devices configured to displace or move the chassis 504 or components therein such as the projector 112 and/or the camera 114. The actuator may comprise a pan motor 510, a tilt motor 512, and so forth. The pan motor 510 is configured to rotate the chassis 504 in a yawing motion, while the tilt motor 512 is configured to change the pitch of the chassis 504. By panning and/or tilting the chassis 504, different views of the scene may be acquired.

One or more microphones 514 may also reside within the chassis 504, or elsewhere within the environment 502. These microphones 514 may be used to acquire input from the user, for echolocation, location determination of a sound, or to otherwise aid in the characterization of and receipt of input from the environment 502. For example, the user may make a particular noise such as a tap on a wall or snap of the fingers which are pre-designated as inputs within the augmented reality environment. The user may alternatively use voice commands. Such audio inputs may be located within the environment 502 using time-of-arrival differences among the microphones and used to summon an active zone within the augmented reality environment. Of course, these audio inputs may be located within the environment 502 using multiple different techniques.

One or more speakers 516 may also be present to provide for audible output. For example, the speakers 516 may be used to provide output from a text-to-speech module or to playback pre-recorded audio.

A transducer 518 may reside within the ARFN 102, or elsewhere within the environment 502. The transducer may be configured to detect and/or generate inaudible signals, such as infrasound or ultrasound. These inaudible signals may be used to provide for signaling between ancillary devices and the ARFN 102. Of course, any other type of technique may be employed to provide for signaling between ancillary devices and the ARFN 102.

A ranging system 520 may also reside in the ARFN 102. The ranging system 520 is configured to provide distance information from the ARFN 102 to a scanned object or set of objects. The ranging system 520 may comprise radar, light detection and ranging (LIDAR), ultrasonic ranging, stereoscopic ranging, and so forth. In some implementations the transducer 518, the microphones 514, the speakers 516, or a combination thereof may be configured to use echolocation or echo-ranging to determine distance and spatial characteristics of the environment and objects therein.

In this illustration, the computing device 118 resides within the chassis 504. However, in other implementations all or a portion of the computing device 118 may reside in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

This illustration also depicts a projector/camera linear offset designated "O". This is a linear distance between the projector 112 and the camera 114. Placement of the projector 112 and the camera 114 at distance "O" from one another aids in the recovery of structured light data from the scene. The known projector/camera linear offset "O" may also be used to calculate distances, dimensioning objects such as ancillary devices, and otherwise aid in the characterization of objects within the environment 502. In other implementations the relative angle and size of the projector field of view 506 and camera field of view 508 may vary. Also, the angle of the projector 112 and the camera 114 relative to the chassis 504 may vary.

In other implementations the components of the ARFN 102 may be distributed in one or more locations within the environment 502. For instance, microphones 514 and speakers 516 may be distributed throughout the environment 502. The projector 112 and the camera 114 may also be located in separate chassis 504. The ARFN 102 may also include discrete portable signaling devices used by users to issue inputs. For example, these may be acoustic clickers (audible or ultrasonic), electronic signaling devices such as infrared emitters, radio transmitters, and so forth.

Example Processes

Figure 6:
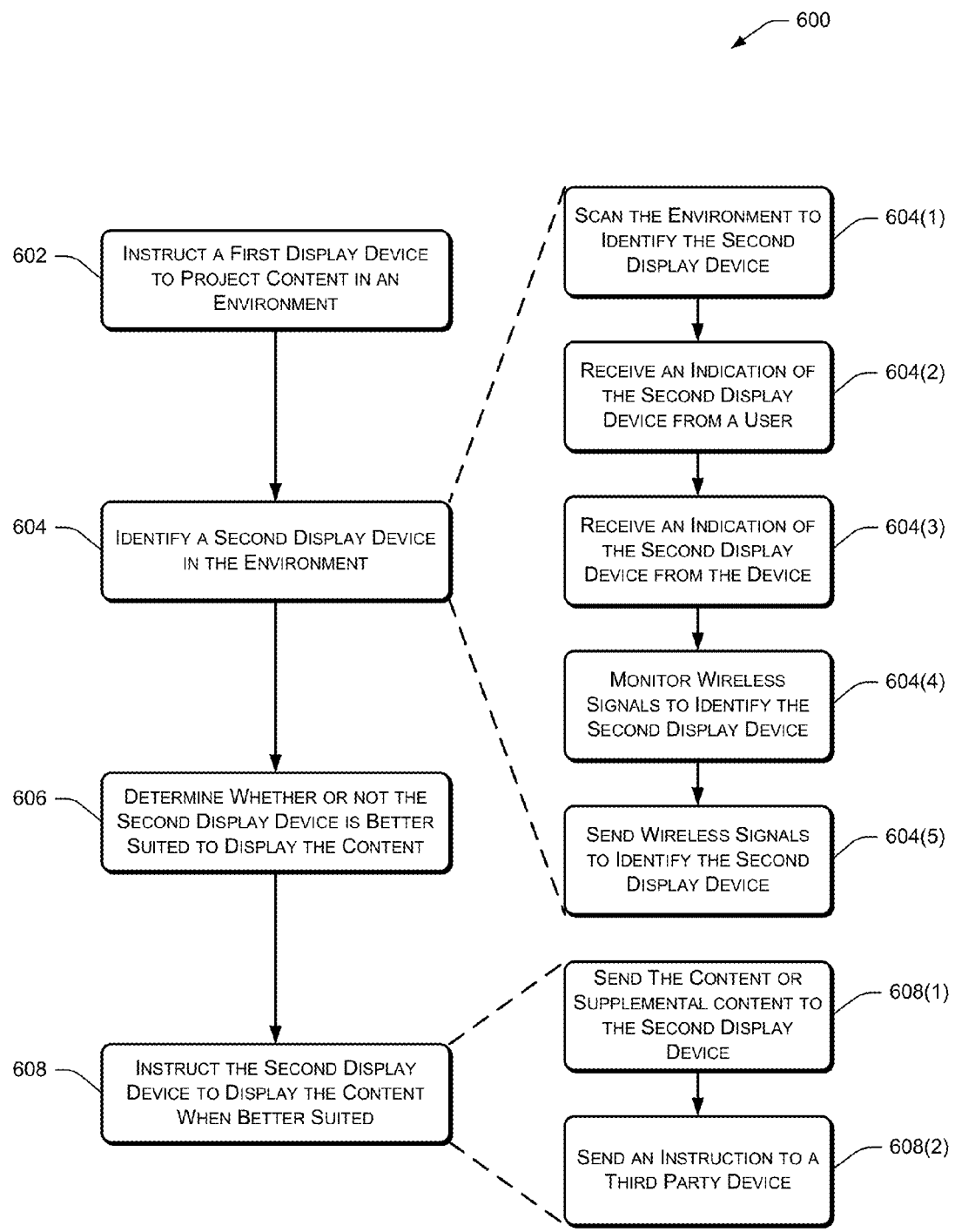
FIGS. 6-7 are illustrative processes of the ARFN determining the presence of an output device and, in response, utilizing the output device to output content for the purpose of enhancing a user's experience.
Figure 7:
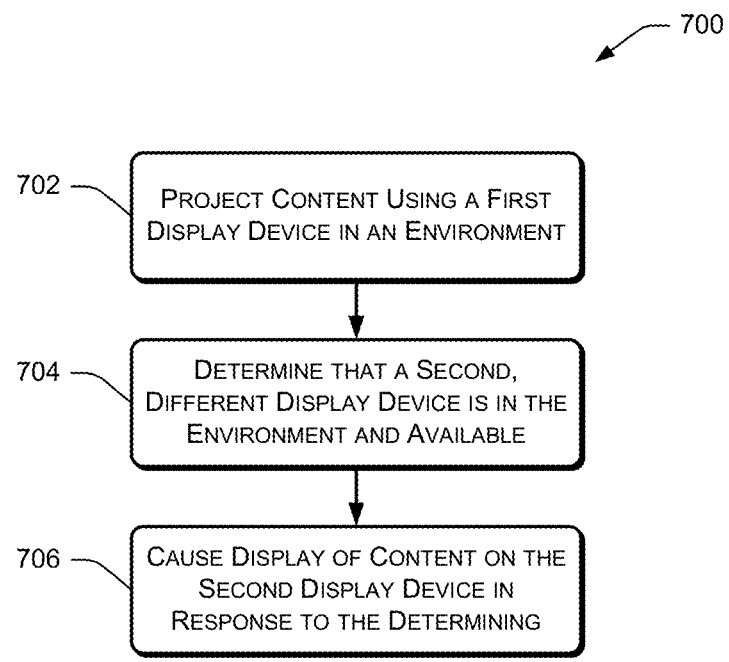
Figure 8:
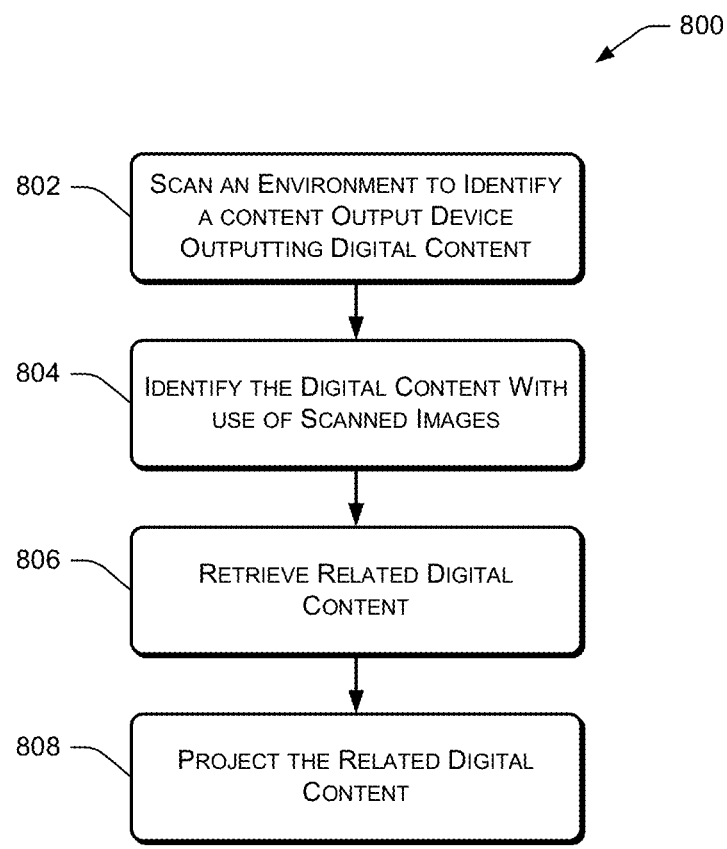
FIGS. 8-10 are illustrative processes of the ARFN complementing the operation of existing output devices in the environment of FIG. 1 for the purpose of enhancing a user's experience.
Figure 9:
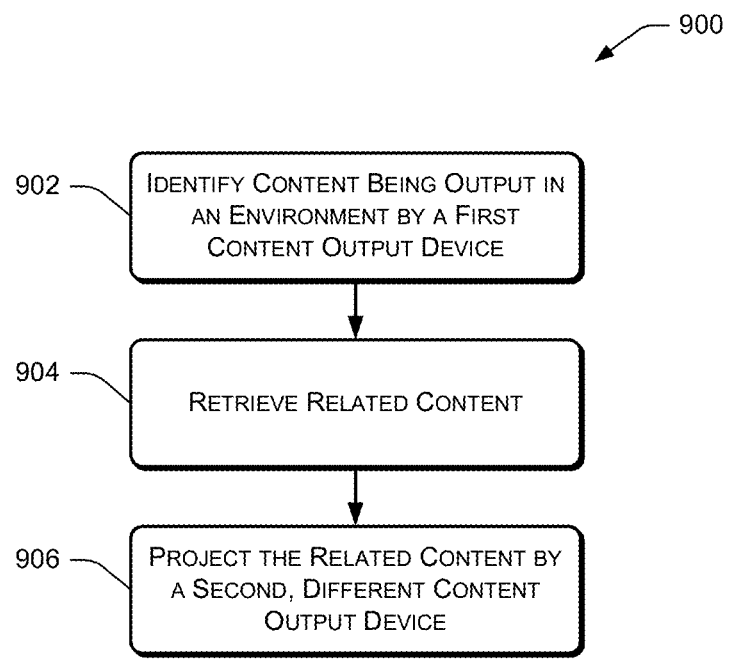
Figure 10:
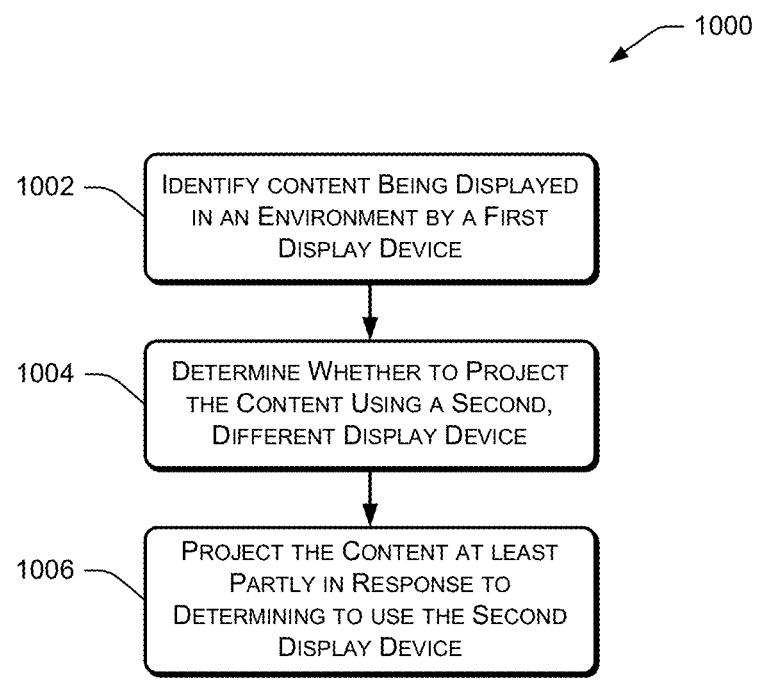

FIGS. 6-7 are illustrative processes 600 and 700 of the ARFN 102 determining the presence of an output device and, in response, utilizing the output device to output content for the purpose of enhancing a user's experience. While the following description may describe the ARFN 102 as implementing these processes, other types of devices may implement a portion or all of these processes in other implementations. FIGS. 8-10 are illustrative processes 800, 900, and 1000 of the ARFN 102 complementing the operation of existing output devices in an environment. The processes described herein may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

The process 600 includes, at 602, instructing a first display device to project content in an environment. For instance, the computing device 118 of the ARFN 102 may instruct the projector 112 to project a movie, an eBook, or any other content. At 604, the ARFN 102 may identify a second display device in the environment. For instance, the ARFN 102 may identify the presence of the television 106, the tablet computing device 108, a mobile phone, an electronic book reader device, or any other computing device.

The ARFN 102 may identify the second display device in any number of ways. For instance, at 604(1), the ARFN 102 may scan the environment to locate the second display device. This may include scanning the environment with a camera to uniquely identify the second display device, with reference to a bar code of the device, a brand name of the device, dimensions of the device, or any other information that may be used to uniquely identify the second display device. The ARFN 102 may also scan the environment to watch for wireless signals (e.g., infrared signals, etc.) sent to or received from the ancillary devices, as described in further detail at 604(4).

Additionally or alternatively, at 604(2), the ARFN 102 may receive an indication of the second display device from a user. For instance, a user within the environment may provide an identification of the second display device to the ARFN 102. At 604(3), the ARFN may additionally or alternatively receive an indication of the second display device from the second device itself. For instance, the second display device may include the application 204 that is configured to send the identity of the second display device to the ARFN 102.

At 604(4), meanwhile, the ARFN 102 may identify the second display device, in whole or in part, by monitoring wireless signals sent to the second display device. For instance, the ARFN 102 may monitor infrared signals sent to the second display device from a remote control used operate the device, or may monitor any other type of wireless signal. Then, the ARFN 102 may identify the second display device by mapping the identified signal to a make and model of the device. Finally, the ARFN 102 may, at 604(5), identify the second display device by sending wireless signals (e g, infrared signals, etc.) to the second display and identifying which signal elicits a response from the device. For instance, the ARFN 102 may send infrared signals to the second display device and, upon identifying a signal that elicits a response, may map this signal to a make and model of the device.

While a few examples have been described it is to be appreciated that the second display device may be identified at 604 using any other suitable technique or combination of techniques.

At 606, the ARFN 102 determines whether or not the second display device is better suited to display the content that is currently being projected. For instance, the ARFN 102 may reference a display characteristic of the second display device to make this determination. This display characteristic may include a resolution of the second display device, a size of the second display device, a location of the second display device within the environment, or any other characteristic. Of course, the ARFN 102 may make this decision with reference to any other factor or combination of factors, including a preference of a user within the environment, ambient lighting conditions in the environment, potential obstructions in the environment, and the like.

At 608, the ARFN 102 may instruct the second display device to display some or all of the content in response to determining that the second display device is better suited. For instance, at 608(1), the ARFN 102 may send the content being projected, or content that is supplemental to the projected content, to the second display device for display. Conversely, at 608(2), the ARFN 102 may send an instruction to display the content or the supplemental content to a third party device, such as a local set-top box, a remote satellite provider, or the like.

FIG. 7 illustrates another process 700 for utilizing output devices within an environment to enhance a user's consumption of content. At 702, the ARFN 102 projects content with a first display device within an environment. For instance, the ARFN 102 may project content via the projector 112 described above. At 704, the ARFN 102 determines that a second, different display device is in the environment and is available for displaying content. The ARFN 102 may make this determination in any of the ways described above, or otherwise. At 706, the ARFN 102 causes display of content on the second display device at least partly in response to the determining. This content may be the projected content, content that is supplemental to the projected content, or any other content. In some instances, the ARFN 102 may cause display of the content on the second display device directly in response to the determining, while in other instances this may also occur at least partly in response to receiving an instruction from a user or device. For instance, a user may request (e.g., via a gesture, a voice command, etc.) to display the content via the ARFN 102.

FIG. 8, meanwhile, illustrates an example process 800 of the ARFN 102 supplementing operation of other content output devices in an environment. At 802, the ARFN 102 may scan an environment with a camera to identify a display device within the environment that is displaying digital content. The device may comprise a television, a personal computer, a mobile phone, or any other device capable of displaying content. At least partly in response to identifying a display device displaying digital content, at 804 the ARFN 102 may identify the digital content with reference to images scanned by the camera (e.g., by comparing the images to known content, by identifying a channel or other identifier of the content, etc.).

At 806, the ARFN 102 retrieves digital content that is related to the identified digital content. Finally, at 808, the ARFN 102 may project, onto a display medium within the environment and via a projector, the digital content that is related to the identified digital content.

FIG. 9 illustrates the process 900, which includes the ARFN 102 identifying content being output in an environment by a first content output device at 902. At 904, the ARFN 102 retrieves content that is related to the content being output by the content output device. At 906, the ARFN 102 projects the related content by a second, different content output device in the environment.

Finally, FIG. 10 illustrates another process 1000 for supplementing the operation of existing display devices in an environment. At 1002, the ARFN 102 identifies content being displayed in an environment by a first display device. At 1004, the ARFN 102 determines whether to project the content using a second, different display device in the environment or whether to allow the first display device to continue displaying the content. Finally, at 1006, the ARFN 102 projects the content using the second display device at least partly in response to determining to project the content rather than simply allowing the first display device to continue displaying the content.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. One or more non-transitory computer-readable media storing computer-executable instructions that, when executed, cause one or more processors to perform acts comprising:
   instructing a first display device to project digital content for viewing within an environment, the first display device having a first display characteristic;
   causing a camera to capture imagery of at least a portion of the environment;
   identifying a second display device located within the environment based at least in part on the imagery captured by the camera;
   selecting, based at least in part on the first display characteristic, the second, different, display device having a second display characteristic, wherein the first display characteristic includes at least a first location of the first display device within the environment and the second display characteristic includes at least a second location of the second display device within the environment; and
   instructing, based at least in part on a comparison between the first display characteristic and the second display characteristic, (i) the second display device to display the digital content and (ii) the first display device to discontinue projecting.

2. One or more non-transitory computer-readable media as recited in claim 1, wherein the first display device comprises a projector that projects the digital content onto a non-powered display medium.

3. One or more non-transitory computer-readable media as recited in claim 1, wherein the second display device comprises a television, a mobile phone, a tablet computer, a laptop computer, a desktop computer, an electronic book reader device, a portable media player, or a personal digital assistant (PDA).

4. One or more non-transitory computer-readable media as recited in claim 1, wherein the causing the camera to capture the imagery further comprises causing the camera to scan the environment to capture the imagery.

5. One or more non-transitory computer-readable media as recited in claim 1, wherein the identifying the second display device further comprises receiving an indication that the second display device resides within the environment.

6. One or more non-transitory computer-readable media as recited in claim 1, wherein the identifying the second display device further comprises receiving an indication from the second display device that the second display device resides within the environment.

7. One or more non-transitory computer-readable media as recited in claim 1, wherein the identifying the second display device further comprises monitoring wireless signals sent from or received at the second display device.

8. One or more non-transitory computer-readable media as recited in claim 1, wherein:
the second display device is controllable via a remote control configured to send infrared signals to the second display device; and
the identifying the second display device further comprises monitoring the infrared signals sent to the second display device via the remote control and identifying the second display device with reference to the infrared signals.

9. One or more non-transitory computer-readable media as recited in claim 1, wherein the identifying the second display device further comprises:
sending multiple different wireless signals to the second display device;
determining which wireless signal of the multiple wireless signals results in a response from the second display device; and
identifying the second display device with reference to the wireless signal that results in the response from the second display device.

10. One or more non-transitory computer-readable media as recited in claim 1, wherein the display characteristic further includes at least one of a type of a display of the second display device, a size of the display of the second display device, or a resolution of the display of the second display device.

11. One or more non-transitory computer-readable media as recited in claim 1, wherein the instructing the second display device to display the digital content comprises sending the digital content to the second display device via a wired or wireless connection or sending an instruction to a third party device that causes the second display device to display the digital content.

12. A method comprising:
under control of one or more computing systems configured with specific executable instructions,
projecting content using a first display device residing in an environment;
determining that a second, different display device also resides within the environment and is available for displaying content, the second display device located at a second location that is different than a first location associated with the first display device;
determining that the second display device at the second location has an absence of physical obstructions that physically obstruct display of the content on the second display device or that physically obstruct a viewing of the content on the second display device;
selecting the second display device based at least in part on the second location of the second display device, a determined availability of the second display device, and the absence of the physical obstructions;
causing display of content on the second display device within the environment; and
terminating the projecting by the first display device based at least in part on the causing the display of the content on the second display device.

13. A method as recited in claim 12, wherein the first display device comprises a projector configured to project content onto a non-powered display medium and wherein the second display device comprises a display device other than a projector.

14. A method as recited in claim 12, wherein the selecting is further based at least in part on determined physical obstructions that physically obstruct display of the content on the first display device or that physically obstruct a viewing of the content on the first display device.

15. A method as recited in claim 14, further comprising:
causing a camera to capture imagery of the environment; and
analyzing the imagery to determine the physical obstructions that physically obstruct display of the content on the first display device or that physically obstruct a viewing of the content on the first display device.

16. A method as recited in claim 12, wherein the content displayed by the second display device comprises at least the projected content.

17. A method as recited in claim 12, further comprising receiving a request within the environment to display at least a portion of the projected content on the second display device, and wherein the causing the display of the content on the second display device also occurs at least partly in response to the receiving of the request.

18. A method as recited in claim 12, wherein the content displayed by the second display device comprises at least a portion of the projected content, and further comprising:
determining that the second display device is better suited for displaying the projected content than the first display device; and
wherein the causing the display of the content on the second display device also occurs at least partly in response to the determining that the second display device is better suited for displaying the projected content.

19. A method as recited in claim 12, further comprising interpreting a gesture from within the environment, wherein the determining that the second display device also resides within the environment and is available for displaying content is based at least in part on the interpreting the gesture, and wherein the gesture identifies at least a location of the second display device.

20. A method as recited in claim 12, wherein the determining that the second display device also resides within the environment and is available for displaying content comprises scanning the environment with a camera to identify the second display device.

21. A method as recited in claim 12, wherein the determining that the second display device also resides within the environment and is available for displaying content comprises receiving an indication that the second display device resides within the environment.

22. A method as recited in claim 12, wherein the determining that the second display device also resides within the environment and is available for displaying content comprises receiving an indication from the second display device that the second display device resides within the environment.

23. A method as recited in claim 12, wherein the determining that the second display device also resides within the environment and is available for displaying content comprises (i) monitoring wireless signals sent from or received at the second display device, or (ii) sending wireless signals to the second display device.

24. A system comprising:
one or more processors;
memory;
a projector, coupled to the one or more processors and configured to project content within an environment at a first location;
a display device configured to display the content within the environment;
an ancillary device identification module, stored in or accessible by the memory and executable on the one or more processors, to identify the display device within the environment and configured to display the content in lieu of the projector projecting the content in response to determining that a second location of the display device is at least one of physically unobstructed or closer to a line of sight of a user than the first location associated with the content projected by the projector; and
a content output module, stored in or accessible by the memory and executable on the one or more processors, to send, at least partly in response to the identifying, a first instruction to the display device to display the content and to send a second instruction to the projector to terminate projecting.

25. A system as recited in claim 24, wherein the display device is configured to output visual content and audible content.

26. A system as recited in claim 24, wherein the content output module is further executable on the one or more processors to provide the content being projected by the projector or displayed by the display device at least partly in response to identifying the display device within the environment.

27. A system as recited in claim 24, further comprising an ancillary device adjustment module, stored in or accessible by the memory and executable on the one or more processors, to adjust, remotely, one or more output settings of the display device.

28. A system as recited in claim 27, wherein the one or more output settings comprise a resolution of the display device, a volume of the display device, a contrast of the display device, or a brightness of the display device.

29. A system as recited in claim 27, wherein the ancillary device adjustment module adjusts the one or more output settings with reference to content being output by the display device.

30. A system as recited in claim 24, wherein:
the ancillary device identification module is further executable to identify multiple output devices within the environment that are configured to output the content being projected by the projector; and
the content output module is further executable to send, at least partly in response to the identifying, respective instructions to the multiple output devices to output the content being projected by the projector.

31. A system as recited in claim 24, wherein the ancillary device identification module is further configured to identify an audio output device also within the environment and configured to emit audio of the content, and wherein the content output module is further configured to send, at least partly in response to the identifying the audio output device, a third instruction to the audio output device to emit the audio of the content.

32. A system as recited in claim 31, wherein the content output module is further configured to send, at least partly in response to the identifying the audio output device, a fourth instruction to the projector to terminate emitting of the audio of the content.

33. A system as recited in claim 31, further comprising the audio output device.

34. A system as recited in claim 31, wherein the audio output device includes wireless speakers.

35. A system as recited in claim 24, wherein the display device comprises a television, a mobile phone, a tablet computer, a laptop computer, a desktop computer, an electronic book reader device, a portable media player, or a personal digital assistant (PDA).

36. A system as recited in claim 24, wherein the projector includes a first display characteristic and the display device includes a second display characteristic, and wherein the content output module determines, based on a comparison between the first display characteristic and the second display characteristic, to transition the digital content from the projector to the display device.

37. A method comprising:
causing a first display device to display content in an environment, wherein the content includes imagery and audio;
causing an original source to emit the audio associated with the imagery;
determining that a second, different display device also resides within the environment and is available for displaying the content;
interpreting a gesture from within the environment, wherein the determining that the second display device also resides within the environment and is available for displaying content is based at least in part on the interpreting the gesture, and wherein the gesture identifies at least a location of the second display device;
causing the second display device to display the content within the environment at least partly in response to the determining; and
causing the second display device to emit the audio of the content.

38. A method as recited in claim 37, further comprising causing an audio device that is different than the projector to emit audio of the content in the environment.

39. A method as recited in claim 37, further comprising continuing, for at least the period of time, to emit the audio of the content from an original source simultaneous with the causing the second display device to display the content.

40. A method as recited in claim 37, wherein the causing a first display device to display content includes causing a projector to project content onto a surface in the environment.

* * * * *